United States Patent [19]
Risman

[11] Patent Number: 5,834,744
[45] Date of Patent: Nov. 10, 1998

[54] TUBULAR MICROWAVE APPLICATOR

[75] Inventor: Per O. Risman, Harryda, Sweden

[73] Assignee: The Rubbright Group, Eagan, Minn.

[21] Appl. No.: 925,233

[22] Filed: Sep. 8, 1997

[51] Int. Cl.$^6$ .............................. H05B 6/70; H05B 6/78
[52] U.S. Cl. ......................... 219/697; 219/696; 219/701; 219/746; 219/750
[58] Field of Search .................................. 219/697, 696, 219/695, 700, 701, 746, 748, 750, 762; 333/227, 228, 230

[56] References Cited

U.S. PATENT DOCUMENTS

| | | | |
|---|---|---|---|
| 3,461,261 | 8/1969 | Lewis et al. | 219/750 |
| 4,129,768 | 12/1978 | Anderson | 219/10.55 A |
| 4,276,462 | 6/1981 | Risman | 219/750 |
| 4,631,380 | 12/1986 | Tran | 219/748 |
| 4,714,812 | 12/1987 | Haagensen | 219/10.55 F |
| 4,760,230 | 7/1988 | Hassler | 219/750 |
| 4,777,336 | 10/1988 | Asmussen | 219/750 |
| 5,400,524 | 3/1995 | Crosnier Leconte | 34/259 |

Primary Examiner—Philip H. Leung
Attorney, Agent, or Firm—Faegre & Benson, LLP

[57] ABSTRACT

An assembly for applying microwave irradiation to a load having a generally circular cross-section. The applicator supports a dominant $TM_{120}$ mode and the load is aligned with a central axis in the applicator, with each aperture of a pair of feed apertures diametrically opposed (for the circular cross sectional case) or located on parallel opposed walls (for the polygonal cross sectional case) with one of the pair of feed apertures positioned at 90 degrees with respect to the other pair about the axis. The applicator may be formed as a cylinder or as a polygonal prism of the type having parallel opposed sides, such as those having a square, hexagonal or octagonal cross-section. Means such as a microwave transparent tube or conveyor provide for positioning of the load in the applicator. In an alternative embodiment, two cavities are used, with one cavity associated with each of the two feed systems, and a means for conveying the load from the first cavity to the second cavity is provided. In one octagonal cross section embodiment, the two feed aperture pairs are located in one cavity.

24 Claims, 7 Drawing Sheets

TUBULAR MICROWAVE APPLICATOR

BACKGROUND OF THE INVENTION

The present invention relates to the field of microwave applicators, including those types of applicators having a load transiting the heating chamber of the applicator in a continuous fashion. The present invention is an improvement in the field of applicators having axially oriented loads, (which may be a liquid) positioned in or moving through a cavity of the applicator along a central axis of the applicator.

DETAILED DESCRIPTION OF THE INVENTION

Figure 1:
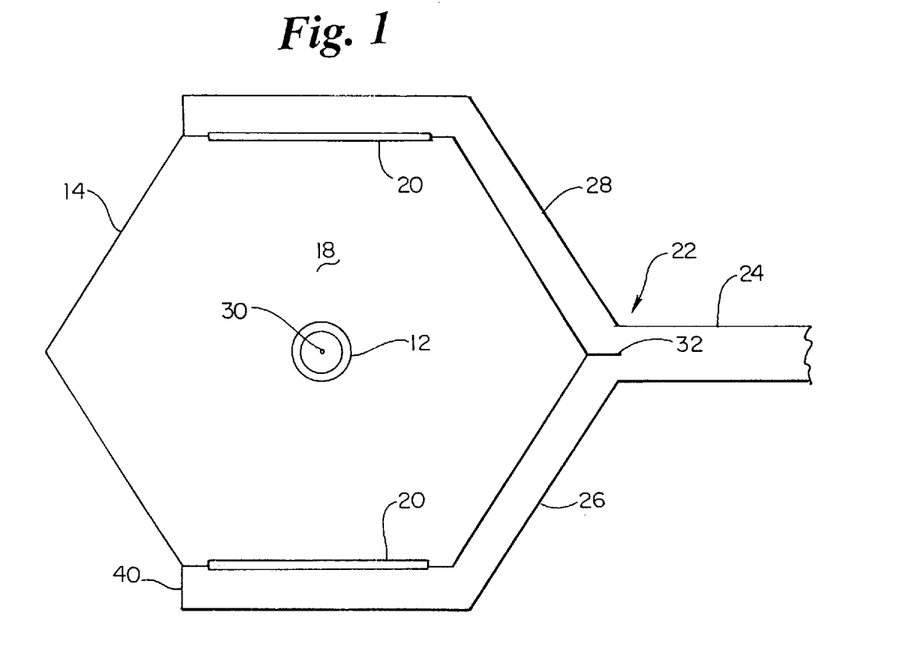
FIG. 1 is a schematic top plan view of a microwave applicator useful in the practice of the present invention.
Figure 2:
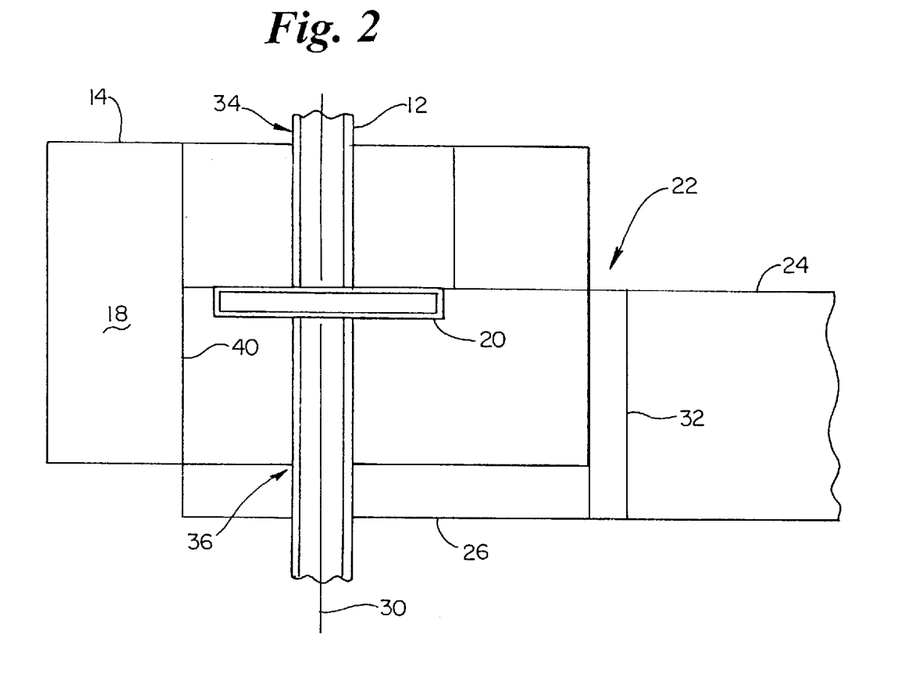
FIG. 2 is a schematic side elevation view of the microwave applicator of FIG. 1.
Figure 3:
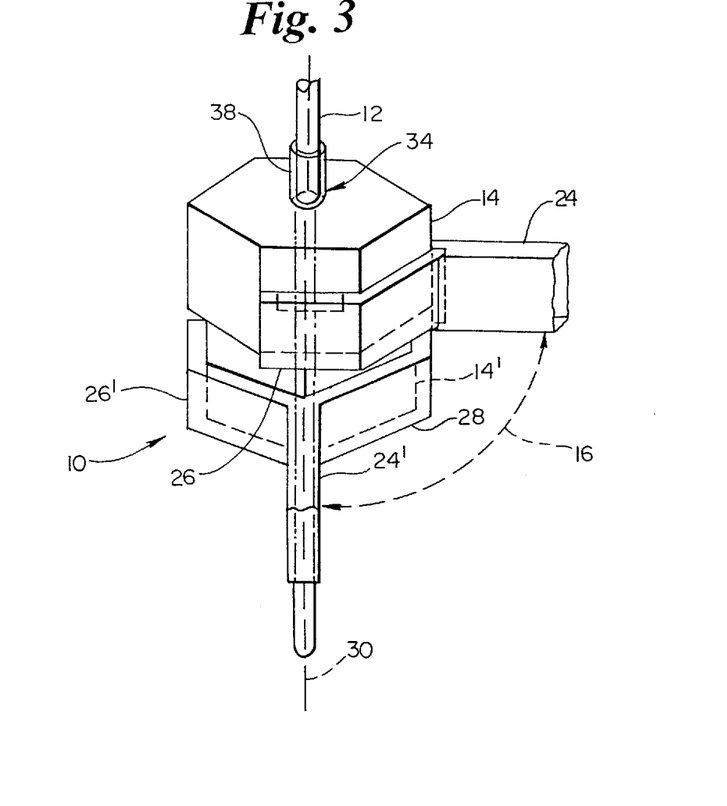
FIG. 3 is a perspective view of a pair of microwave applicators of the type shown in FIGS. 1 and 2, positioned together to form an assembly useful in the practice of the present invention.
Figure 9:
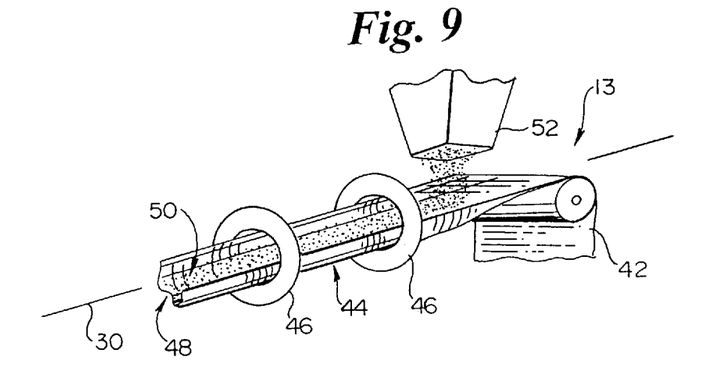
FIG. 9 is a fragmentary view of an alternative embodiment for load containment and transport useful in the practice of the present invention.

Referring to the Figures, and most particularly, to FIGS. 1, 2 and 3, the present invention relates to an assembly 10 for applying microwave irradiation to a generally circular cross section load positioned in a cavity 18 by a microwave transparent tube 12. As used herein, "cylindrical" means "having a constant cross-section in one direction." In the practice of the present invention, the load may be stationary in the cavity 18 or may be transported through one or more cavities forming the applicator of the present invention. If desired, other means for statically positioning the load other than tube 12 may be used, and other means for dynamically positioning and conveying the load through the assembly 10 may be provided, one example being a conveyor 13 as shown in FIG. 9.

Figure 10:
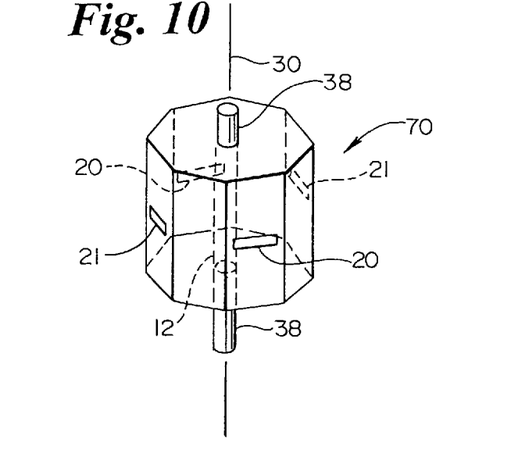
FIG. 10 is a simplified perspective view of a single cavity, octagonal cross section alternative embodiment useful in the practice of the present invention when used with the feed systems of FIGS. 11–14.
Figure 11:
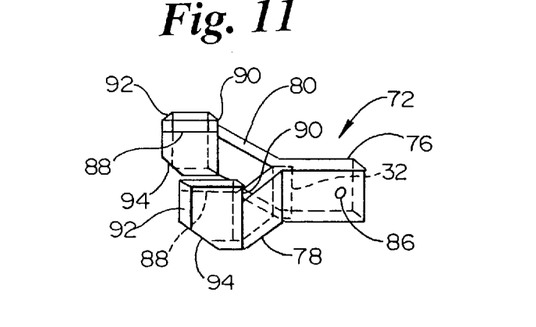
FIG. 11 is a perspective view of a first microwave feed system for the octagonal cross section cavity of FIG. 10.
Figure 12:
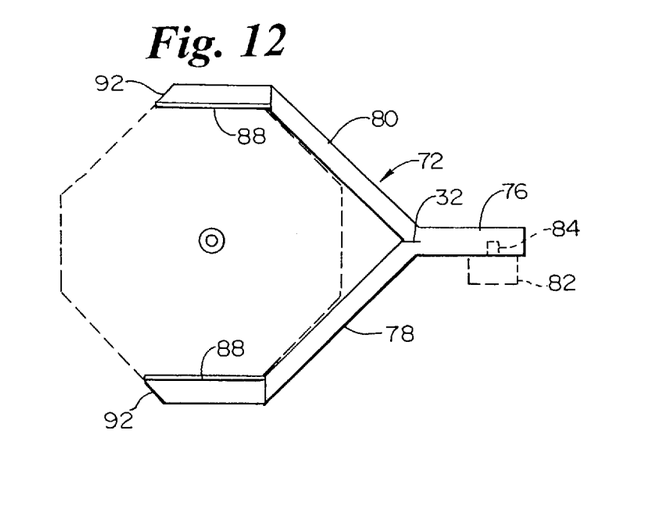
FIG. 12 is a top plan view of the microwave feed system of FIG. 11.
Figure 13:
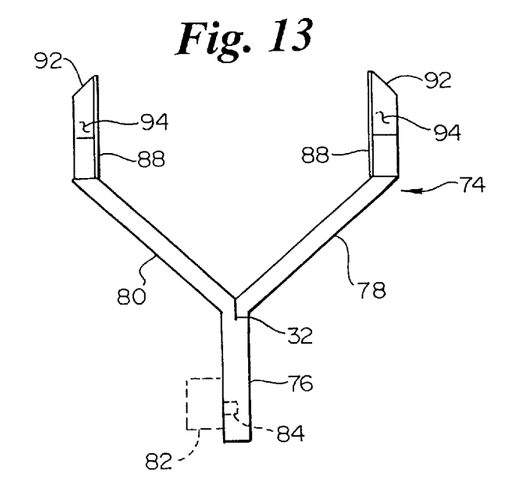
FIG. 13 is a top plan view of a second microwave feed system for the cavity of FIG. 10.
Figure 14:
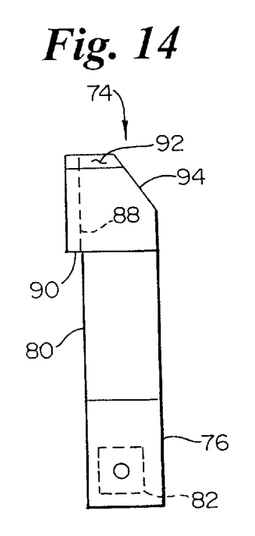
FIG. 14 is a side elevation view of the second microwave feed system of FIG. 13.

The assembly 10 of the first embodiment preferably includes a pair of microwave applicators 14, 14' each of which are shown to be hexagonal in cross section in the top plan view of FIG. 1. It is to be understood, however, that a single applicator may be used with two pairs of feed systems, if desired, in which case it is preferable to use an octagonal cross section cavity as is shown in FIG. 10. As a still further alternative, circular cross-section applicators are also to be understood to be within the scope of the present invention, as are other polygonal prisms having parallel, opposed sides, such as, for example, those having a square or octagonal cross-section. In the polygonal cross-section versions, the configuration and dimensions must be such as to permit opposed feed apertures capable of delivering 180 degree phase shifted magnetic fields to the interior of the cavity formed by the polygonal prism.

In the embodiment shown, each applicator 14 is sized to support only one dominant mode, preferably a $TM_{120}$ type, (transverse magnetic type with indexing using the nomenclature for circularly polarized cylindrical resonators, $TM_{mnp}$ where m is the circumferential direction, indicated by the greek character phi: $\phi$, n is the radial direction, indicated by the greek character rho: $\rho$, and p is the axial direction of propagation indicated by "z") and the prismatic cavity and feed system of the second applicator 14' is positioned at 90 degrees with respect to the first applicator 14, indicated by the dashed line 16 in FIG. 3. In practice, while theoretically desirable to have only one "pure" mode present in the cavity, it has been found desirable to extend the axial length of the cavity (e.g., to reduce the power density in the load along the axis) recognizing that such increased length may allow the existence of "secondary" modes which may, in fact, disrupt the "evenness" of the heating pattern obtainable with a single mode, but with a result that is acceptable from an "evenness" perspective, while still maintaining the "dominance" of the desired mode.

Each applicator has a microwave cavity 18 fed by a pair of slot apertures 20, coupling microwave energy from a waveguide feed system 22. Feed system 22 has a waveguide 24 connected to a source of microwave energy (not shown, but typically a magnetron) operating at a predetermined frequency, typically 2450 MHz. Waveguide 24 supplies a symmetrical rectangular $TE_{10}$ split waveguide arms 26, 28 with slot apertures 20 sized and positioned to only excite the $TM_{120}$ mode in the cavity 18 of each applicator 14, 14'.

Figure 5:
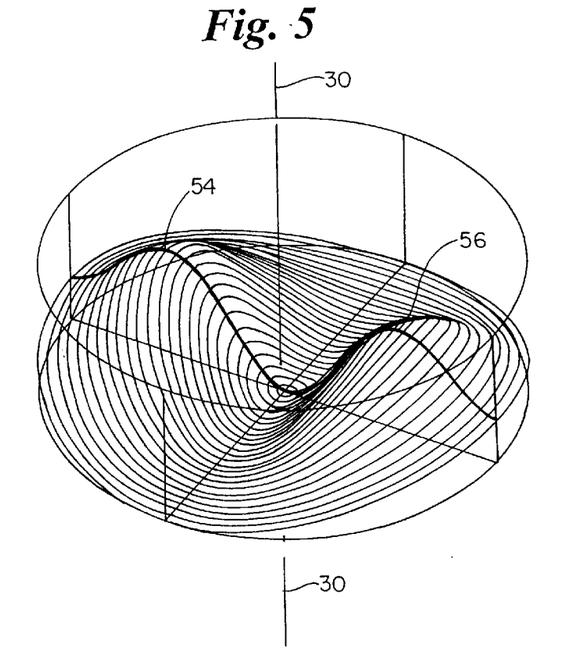
FIG. 5 is a computer-generated image of the power density in a first load using an applicator of the type shown in FIGS. 1 and 2.
Figure 6:
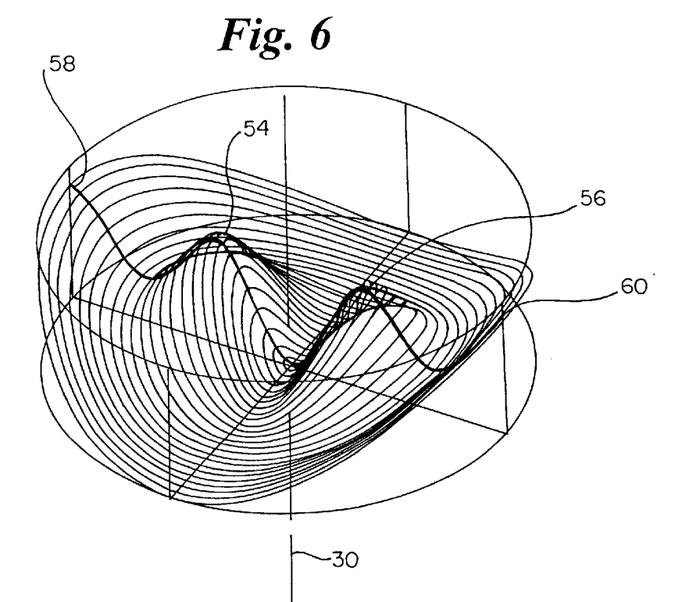
FIG. 6 is a computer-generated image of the power density in a second load using an applicator of the type shown in FIGS. 1 and 2.

As may be seen by reference to FIGS. 5 and 6, using a single feed system in a single applicator will result in a generally uneven heating pattern. While this may be suitable and an appropriate practice of the present invention in some applications, in most applications of the present invention it is anticipated that two applicators will be used to provide a circumferentially even heating pattern. It is to be noted that the pattern shown in FIG. 5 has a certain amount of peripheral heating less than maximum, and FIG. 6 has maxima 58 and 60 at the periphery of the load. Each of these two patterns may have particular advantages. With loads that are to be heated as much as possible and when there is no (or minimal) detriment to edge heating, the pattern of FIG. 6 may be most desirable. On the other hand, when it is desired to avoid edge overheating (with consequent detriment, e.g., sticking to the tube 12 or other load positioning means), it may be desirable to practice the present invention with the pattern shown in FIG. 5, with less heating concentrated at the outer edge of the load.

With two applicators, each is to be positioned with respect to the other at 90 degrees about the axis of travel 30 of the load. With a single applicator a means of positioning the load along a central axis 30 will be necessary. With multiple applicators, a means of moving the load through the applicators as well as positioning the load in each applicator will be desirable. Liquid and other "flowable" (or pumpable) loads can be both positioned in and moved through the applicator using the tube 12. As an alternative to the dual applicator system where each applicator has a single pair of feed apertures, a single applicator with two feed systems (four apertures in a single cavity) may be used. In such a system, the two feed systems (each having two opposed, parallel feed apertures) operate alternately (i.e., with each fed by a halfwave power supply, each of which is 180 degrees shifted at the frequency of the power supply, typically 60 Hz) to avoid interference between the modes created by each feed system.

Figure 4:
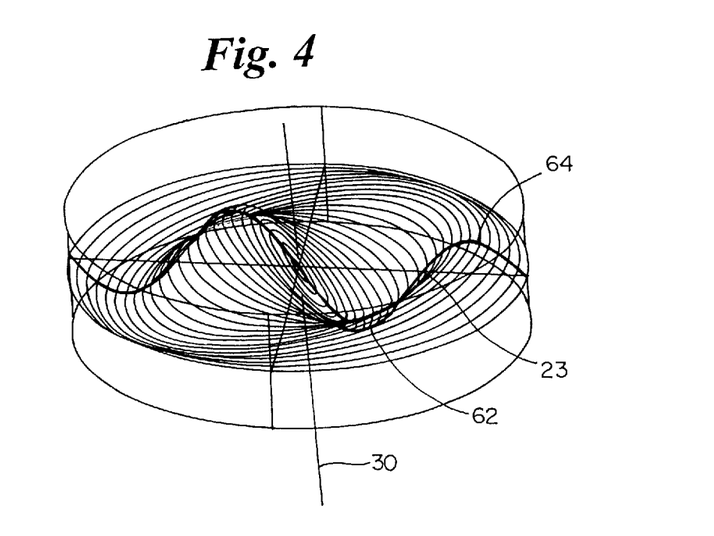
FIG. 4 is a computer-generated image of the E field intensity in the space normally occupied by a load in an empty applicator of the type shown in FIGS. 1 and 2, illustrating a $TM_{120}$ mode.

For each of these versions, the design of an individual feed system 22 must permit only the excitation of single dominant mode, preferably a $TM_{120}$ type mode, (as shown in FIG. 4) in the applicator. As a consequence of this mode, there will be a second E field minimum 23 some distance inside the load in addition to the minimum at the central axis 30 of the applicator. The field in an empty applicator becomes, in accordance with the literature (for example *Time-harmonic Electromagnetic Fields* by Harrington, McGraw-Hill, 1961, page 205) and after some reductions:

$$E_z = j(x_{1n}/b)^2/\omega\epsilon_0 \epsilon J_1(x_{1n}\pi/b)\cos n\phi \quad \text{(Eq. 1a)}$$

$$H_\rho = J_1(x_{1n}\rho/b)\rho \sin n\phi \quad \text{(Eq. 1b)}$$

$$H_\phi = x_{1n}/\rho J_1'(x_{1n}\rho/b)\cos n\phi \quad \text{(Eq. 1c)}$$

where ' denotes the derivative which can be calculated as $\frac{1}{2}J_o(x_{1n}\rho/b) - \frac{1}{2}J_2(x_{1n}\rho/b)$; $x_{1n}$ is the nth zero of $J_1(x)$ [the first order Bessel function] and b is the radius of the cavity.

The scaling factor for determining cavity dimensions is (in the general case):

$$(x_{1n}/b)^2 + k_z^2 = k_o^2 \quad \text{(Eq. 2)}$$

where $k_o = 2\pi f/c_0 = 2\rho\lambda_o$ is the wavenumber. Since the last index p=0, $k_z$=0.

The first zero $x_{11}$=3.832 and corresponds to a diameter $2b = 2x_{11}/k_o$ of 148.6 mm at 2460 MHz of an empty $TM_{110}$ resonant applicator. The second zero $x_{12}$=7.016 and corresponds to a diameter $2b$ of 272.2 mm at 2460 MHz of an empty $TM_{120}$ resonant applicator.

The $E_z$ field intensity in the load space of an empty $TM_{120}$ applicator with the dimensions given above is illustrated in FIG. 4. The intensity maxima 62, 64 are where $J_1'$ (the first derivative of the first order Bessel function of the first kind) is zero; these zeroes are of special importance as will be discussed infra, and are $x'_{11}$=1.841 and $x'_{12}$=5.331. The power density in the load becomes proportional to $\epsilon''|E_z|^2$, where $\epsilon''$ is the dielectric loss factor.

It has been found that when two equal applicators are used after one another, and are angularly spaced by $\phi$=90 degrees, [as shown by dashed line 16 in FIG. 3], the resulting heating pattern becomes constant along the circumferential direction, since $\sin^2\Phi + \cos^2\phi = 1$. The only remaining concern is to equalize the temperature rise caused in the load by thermal conduction due to radial distribution of microwave power in the load.

Turning now to the electric field pattern in the load, it is of importance to note that the axially directed electric field pattern in a load with circular cross section axially centrally positioned in an applicator of the present invention can be described as a sum of modal patterns based on a set of cylindrical Bessel functions, $J_m$, of the first kind and mth order, as $J_m(k\rho)\cos(m\phi)$, where k is a wavenumber $2\pi(\sqrt{\epsilon})\lambda_o$, $\rho$ is the radial distance from the axis 30, and $\phi$ is the circumferential angle. The complete wave functions are well known, and specified in conventional texts on electrodynamics, and may also include circumferential and radial components, again containing only a $J_m(k\phi)$ radial variation, where k is now instead equal to $2\pi[\sqrt{(\epsilon-\nu^2)}]/\lambda_o$, where $\nu$ (greek "nu") is a normalized wavelength which becomes 1 in the case of a mode with zero axial mode index.

Figure 15:
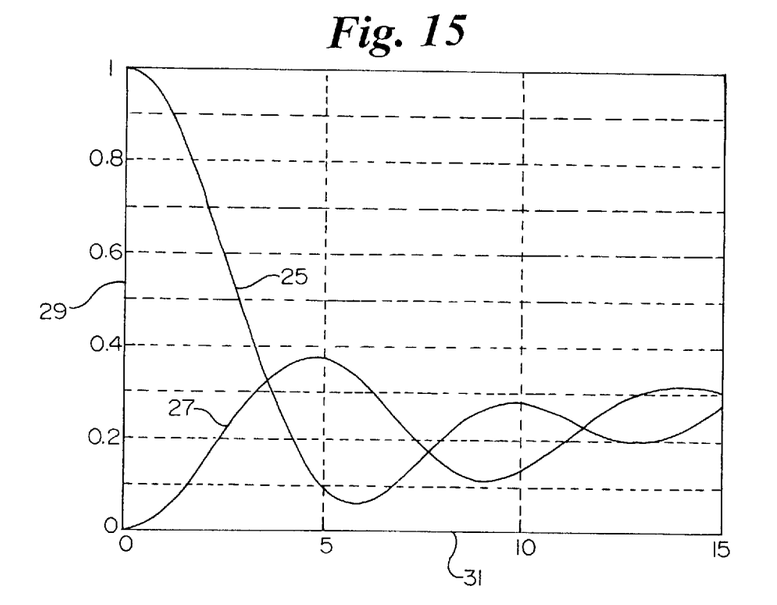
FIG. 15 is a plot of relative power densities as a function of radial position for a circularly cylindrical load in a cavity to illustrate certain aspects of the present invention.

Referring now to FIG. 15, the two first Bessel functions $J_o(\kappa\rho)$ and $J_1(\kappa\rho)$ are shown as $(J_o(\kappa\pi)[J_o(\kappa\pi)]^*$, with k=$2\pi[\sqrt{(60-j25)}]/\lambda_o$ and with the radius in mm (where * is the complex conjugate). Curve 25 shows the Bessel function for a $TM_{0n0}$ mode, and curve 27 shows the Bessel function for a $TM_{1n0}$ mode. The ordinate 29 shows relative power density, and the abscissa 31 is the radial direction, in millimeters (mm) for operation at 2450 MHz. It is to be understood that each curve 25, 27 shows a separate case, with the amplitudes of the curves 25, 27 independent of each other. Apart from the factor $\cos(m\phi)$, which is 1 for m=0, the curves 25, 27 show the relative heating intensity for each of the two first TM modes (angular, or first, index m=0 and 1, respectively) as a function of the radius of centered loads, irrespective of their actual radii, in the case of the last axial mode index p=0. For low loss loads, the minima of the curves will go down to zero relative intensity. For the $TM_{1n0}$ load mode, there will be a minimum at the center and at the periphery of a 9 mm radius load. In consideration of the fact that the total power in a circular layer of thickness $\Delta\rho$ is also proportional to $\rho$, and that the diameter of the less heated center region is only about 4 mm for the $TM_{1n0}$ load mode, the center heating minimum will be acceptable for many applications.

In one aspect of the present invention, an internal resonance for a $TM_{1n0}$ mode means that the oscillating capacitive and inductive field component energies in the load are equal. If the load has reasonably low losses, this occurs when the $E_z$ field has a maximum in the radial direction. In FIG. 15, the Bessel functions correspond to an E field maximum at about 14 mm radius. There is no generally accepted mode designation for this. For the load and cavity combination, the convention is that the second index is the number of minima (or zeroes) along the radius, excluding one at the axis 30. In the case presented, there is one minimum in the load and another at the cavity periphery. One may therefore call the internal resonance $TM_{1,1\frac{1}{2},0}$ since there is a maximum E at the load periphery, between the (second) index 1 and index 2 minima.

Figure 16:
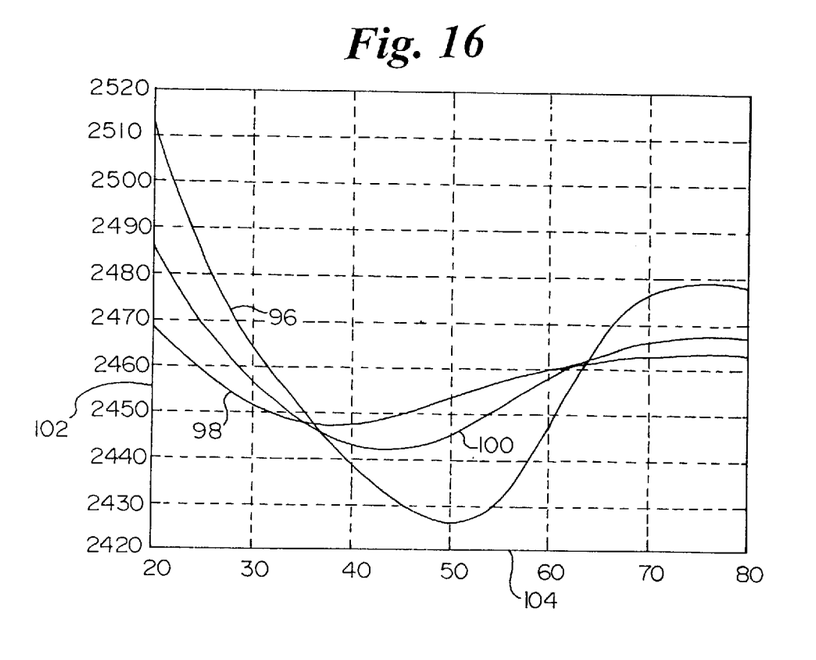
FIG. 16 is a plot of resonant frequency behavior of a load of 27 mm diameter in a 159 mm internal diameter circular applicator, with real permittivity as the variable and the dielectric loss tangent as a parameter.

It has been found that differences or changes in the complex permittivity of the load will be automatically compensated for when the load radius is chosen for internal load resonance and the cavity radius (or internal wall-to-wall dimension, for polygonal cross section cavities) is chosen for system resonance, both at the same frequency. Referring to FIG. 16, a plot of resonant frequency as a function of $\epsilon'$ with tan $\delta$ as a parameter may be seen for a load diameter of 27 mm in a cavity having an internal diameter of 159 mm. In this Figure, curve 96 is for tan $\delta$=0.3, curve 98 is for tan $\delta$=0.7 and curve 100 is for tan $\delta$=0.5, with the ordinate 102 in MHz and the abscissa 104 giving values for $\epsilon'$. In the practice of the present invention, it has been found desirable to operate the system (i.e., irradiate the load) where the slope of the curve for the load of interest is increasing with increasing $\epsilon'$ and at or near its maximum. For example, with the load shown of $\epsilon'$=60 and tan $\delta$=0.3, the resonant frequency is 2450 MHz. Operating in the region of these values will automatically compensate for changes in the complex permittivity of the load, whether the changes are inherent in the initial condition of the load material, or arise as a result of the microwave processing the load material undergoes in the applicator of the present invention.

Turning now to the design of the cavity for the present invention, a "reflection factor method" may be used to calculate resonant frequencies and other data on the behavior of the applicator cavity 18. This approach employs radially propagating inward and outward waves, where the excitation is with a perfect field matching at a radius "b" in the applicator. The amplitude and phase of the returning wave at the position b provide load reflection factors. With a constructed matching at or near the resonant frequency, polar plotting of impedance behavior as a function of frequency can be performed.

The mode functions in the load with radius a and the region outside the load to the cavity radius b become [using Harrington, op. cit., p. 201 and 208]:

$$\psi = A \cdot J_l(k_o\sqrt{\epsilon}\rho) \cdot \cos\phi \quad (\rho \leq a) \quad \text{(Eq. 3a)}$$

$$\psi = 1 \cdot H_l^{(1)}(k_o\rho) \cdot \cos\phi + B \cdot H_l^{(2)}(k_o\rho) \cdot \cos\phi \quad (a \leq \rho \leq b) \quad \text{(Eq. 3b)}$$

where $H^{(1)}m$ and $H^{(2)}m$ are the Hankel functions of the first and second kinds, respectively. $H_{(1)}m$ represents an inwards going wave and has a normalized amplitude factor 1. $H_{(2)}m$ represents the outwards going wave and its amplitude factor B is therefore the load reflection factor $r^-$, referred to $\rho$=a. There is also an amplitude factor A for the internal load field.

The two amplitude factors can be solved for by setting the $E_z$ fields equal on $\rho$=a (since this component is parallel to the load surface), and by also setting the $H_\phi$ fields equal there (since the load has the same permeability as the applicator space).

$$A \cdot J_l'(k_o\sqrt{\epsilon}a) \cdot \sqrt{\epsilon} = B \cdot H_l^{(2)\prime}(k_oa) + 1 \cdot H_l^{(1)\prime}(k_oa) \quad \text{(for } H_\phi\text{)} \quad \text{(Eq. 4a)}$$

$$A \cdot J_l(k_o\sqrt{\epsilon}a) = B \cdot H_l^{(2)}(k_oa) + 1 \cdot H_l^{(1)}(k_oa) \quad \text{(for } E_z\text{)} \quad \text{(Eq. 4b)}$$

It may be noted that the sign on the $BH^{(2)}{}_1{}'(k_o a)$ term should not be negative in Equation 4a and 4b (as is the case for plane wave scenarios using trigonometric functions) because of the way Hankel functions are defined.

The reflection factor B must now be referred to the $\rho$=b position. This is by just including the radial propagations; one obtains the load reflection factor of the cavity as:

$$r_{b-\rho} = [B \cdot H^{(2)}{}_1(K_ob)]/H^{(1)}{}_1(k_ob) \quad \text{(Eq. 5)}$$

where r refers to the E field and is therefore negative real at resonance. The roots are obtained by iterative searching for $\text{Im}(r_{b=\rho})$=0 (finding roots where the Imaginary part=0). Even though r is important, the system reflection factor is of more importance, assuming a cavity coupling factor and transmission line impedance that provides matching at the cavity resonance frequency.

If the propagating, stationary (time-harmonic) signal amplitudes in the forward and backward directions in the transmission lines are called $C_g^+$ and $C_g^-$, the quotient $C_g^-/C_g^+$ is the transmission line reflection factor $\Gamma$; it may be represented as a complex number $|\Gamma|e^{j\phi}$ representing its amplitude and phase angle in a suitable reference plane which may be the applicator port or generator coupling plane in the upstream portion of the waveguide.

In the applicator space the signals are 1 and $r_{b=\rho}$, respectively. Different notation is used for transmission line impedances and reflection factors (Z and $\Gamma$) and for the corresponding wave quantities ($\eta$ and r). The proper integration is done in a plane of aperture 20. The boundary conditions for voltage and current in the plane then give:

$$C_g^+(1+\Gamma)=(1+r_{b-\rho}) \text{ (voltage and } E \text{ field)} \quad \text{(Eq. 6a)}$$

$$C_g^+(1-\Gamma)=(1-r_{b-\rho})\eta \text{(current and H field)} \quad \text{(Eq. 6b)}$$

It is convenient to label the quotient $$Z_g/\eta \equiv \kappa_{g,1} \quad \text{(Eq. 6c)}$$

where $\kappa$ is the coupling impedance ratio. With $r=r_{b=\rho}$ the transmission line reflection factor $\Gamma$ becomes:

$$\Gamma=[(1+r)-\kappa(1-r)]/[(1+r)+\kappa(1-r)] \quad \text{(Eq. 7)}$$

Figure 7:
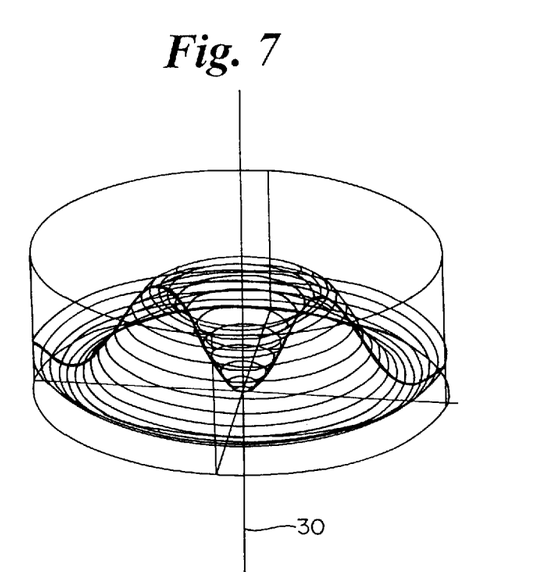
FIG. 7 is a computer-generated image of the heating pattern in a third load using the assembly of FIG. 3 in the practice of the present invention.
Figure 8:
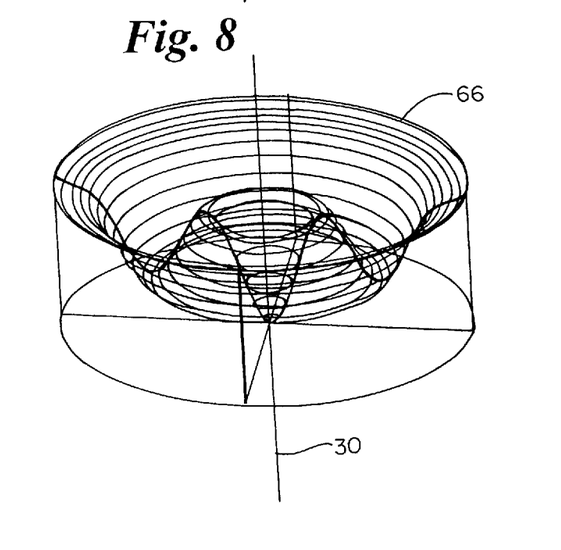
FIG. 8 is a computer-generated image of the heating pattern in a fourth load using the assembly of FIG. 3 in the practice of the present invention.

The field patterns in the load are a function of only the frequency and dielectric properties and not a function of the load diameter, i.e., the field pattern as such in a region inside the load is independent of how large the diameter of the load is. The heating pattern with two 90 degree displaced applicators 14, 14' as arranged in FIG. 3 is given in FIG. 7 for a load of 25 mm diameter and permittivity 50-j15, and in FIG. 8 for a load of 35 mm diameter with permittivity 50-j25, both at 2460 MHz operating frequency (2460 MHz is used here as more representative of the operating frequency of presently available magnetrons). It is to be understood that the representation in FIG. 8 is ordinarily unsatisfactory in that (circumferential) edge overheating will occur along boundary 66. Peripheral heating will increase with both tan $\delta$ and with the diameter, since the radius for minimum heating is roughly proportional to $|\sqrt{\epsilon}|$. It is to be understood that the pattern in FIG. 7 is considered undesirable for a plug-type load which does not convect or which is not stirred or made turbulent during heating, but may be found desirable for other types of loads.

In FIGS. 5 and 6 the patterns have two "hot spots" or more properly "hot cylinders" 54, 56 aligned with the axis 30, because these figures represent the heating pattern for one applicator with only one feed system. In FIG. 5, the load has a permittivity of 25-j12.5; in FIG. 6, the load permittivity is 60-j30, and in each case the load diameter is 26.8 mm. As can be seen, the "hot cylinders" 54, 56 are displaced dependent on load permittivity, and the load shown in FIG. 6 further has maxima 58, 60 at the periphery for the high $\epsilon'$ in the resonant load due to the so-called "magnetic wall" effect. For a low $\epsilon'$ material, there is almost a minimum (i.e., antiresonance). Hence the load impedance changes rather strongly with $\epsilon'$ in a way that changes the field external to the load such that resonant frequency of the combined applicator cavity free space and the load remains substantially constant, thus carrying out the "auto-compensating" aspect of the present invention.

It is most important to note that in the applicator of the present design, the load becomes resonant when operated at the largest slope of frequency increase with increasing $\epsilon$. Using an example where tan $\delta=0.3$, the slope will be maximized at $\epsilon'\approx?$. The argument$(2\pi\lambda_o)\sqrt{\epsilon'}a$ then becomes about 5.34. A maximum of the $J_1(x)$ function is at 5.33. The load has a lower impedance than the surrounding space, (the "magnetic wall" effect) which results in parallel E field maximum at its surface. With the load near internal resonance, the combination of the cavity and load create an inductive and capacitive compensation when the frequency is varied, due to the varying coupling factor of the load to the surrounding space. As has been mentioned, this compensation maintains the total system resonant frequency.

Viewed another way, the reflection factor has its lowest value when the anomalous resonant frequency behavior is strongest, i.e., when the positive derivative $df_R/d\epsilon'$ is highest. Since the load has a high permittivity, it normally represents a low impedance boundary for the inwards propagating radial wave towards it. However, when the internal standing wave in the load has an $E_2$ field maximum there (under variation of load permittivity or operating frequency), the impedance gets a maximum, and the transmission of the inwards propagating wave becomes maximum. Since all the losses are in the load, the reflection factor must have its lowest absolute value. This is confirmed by calculation of the "inflection radius" $\rho_1$ by the behavior of the $J_1(k_o[\sqrt{\epsilon}]\rho)$ function. The intensity maxima are when $J_1'$ is zero; the one of interest is $x'_{12}=5.331$. One thus obtains, to the first order:

$$\rho_1 = 103.4/|\sqrt{\epsilon}| \quad \text{(at 2460MHz)} \tag{Eq. 8}$$

With $\epsilon=48.5-j14.6$ and $|\sqrt{\epsilon}|=50.6$, $\rho_1=15$ mm. Equation 8 gives $|V_\epsilon|=47.5$.

The inflection radius concept explains why $\rho_1$ is lower for higher tan $\delta$ and also that the phenomenon becomes weaker: the internal standing wave in the dielectric becomes weaker due to absorption, and the E field component due to $\epsilon'$ becomes obscured by the component due to $\epsilon''$.

Turning now to considerations of the cavity length and feed system, the axial heating pattern of a resonant $TM_{mnp}$ cavity of length l with a load extending throughout the cavity along the axis will be of a $\cos^2(p\pi/l)$ character, where p is the axial (last) mode index.

If p=0, the heating pattern becomes constant in the axial direction. Thus it is most desirable to ensure that only a $TM_{mn0}$ mode exists in the cavity, by design of the cavity length l and feed.

In the present design, the feed slots 20 are placed diametrically opposite each other, perpendicular to the z (axis) direction and located at half the cavity length ½l. In addition, the two slots provide 180 degree phase difference of the $H_\phi$ fields (circumferential direction) in the applicator. In the practice of the present invention, the feed system is to provide symmetrical anti-phase between the two slots 20. Using a square, hexagonal or octagonal cross section applicator, each slot can be made straight, since each polygon face is sufficiently wide to accommodate a slot length of about ½$\lambda_o$. Thus the hexagonal and octagonal embodiments are preferred because of their accommodation of opposed feed apertures 20 in respective individual parallel faces of such polygonal prisms. In the hexagonal cross section embodiment shown, each face is preferably 90 mm wide, with a distance of 157 mm between opposed parallel sides. Using a Y junction provides better matching than a T junction. A matching plate or flag 32 is used to stabilize performance and match impedance. Flag 32 is used to split the field with minimum disturbance and to provide a mismatch for reflected energy coming from one slot 20 in the cavity 18 and which would possibly otherwise go to the other slot in the same cavity. The flag 32 preferably extends away from the cavity into the throat of the Y junction and extends across the full width of the waveguide.

With the 180 degree phase shift between the slots, only modes having an odd first index will be excited. Furthermore TE modes will not be excited since the H field is perpendicular to the slot direction.

Placing the slot at ½l precludes excitation of TM modes with odd index p since such modes have zero H field there. Thus it is only possible to excite $TM_{mnp}$ modes with odd m and even p. The diameter of an empty circular cavity with the $TM_{3np}$ mode theoretically becomes 1.67 times larger than for the $TM_{1np}$ mode. A TM mode with this high m index is characterized by a quite low field intensity in the center, as is even more the case for still higher m index modes. Therefore, there are two reasons why the $TM_{3np}$ modes are not excited: the diameter would need to be at least 325 mm, and the coupling to the load becomes weak so that there is almost no diameter reduction for resonance with a load.

Finally, only the $TM_{1n2}$ mode remains to be considered. If the distance l is made less than $\lambda_0$ this mode cannot be excited under any load conditions. However, since the system is resonant for p=0, it is possible to apply Equation 2 to calculate how far away from p=2 resonance the system may be. Rewriting Equation 2:

$$(2\pi/\lambda_0)^2 = (x_{1n}/b)^2 + (p/l)^2 \tag{Eq. 9}$$

and realizing that the left side term equals the first term to the right if p=0, $\lambda_0$ would have to change by over 30% if l=120 mm for 2460 MHz. Therefore a length l=120 mm will not result in any disturbing spurious modes with index 2. There is no other resonance within ±200 MHz, and the axial evenness of heating observed with the applicator of the present invention confirms that there are no spurious modes materially affecting the desired microwave irradiation according to the $TM_{120}$ mode. However, it is to be understood to be within the scope of the present invention to allow additional modes in the cavity, provided that such additional modes do not significantly adversely affect the heating pattern created by the dominant mode intentionally introduced into the cavity according to the principles of the present invention.

Using non-circular cylindrical geometries (e.g., hexagonal or octagonal cross sections) allows certain additional practical advantages, chiefly in the ease of construction and assembly of the applicators useful in the practice of the present invention. Using an octagonal cross section allows ease of alignment when one applicator is positioned adjacent another, because such a geometry has sides or faces at 90 degrees to each other which can be used for alignment between applicators when a pair of applicators are positioned at 90 degrees to each other about the axis 30.

The conversion from circular to polygonal cross section is given by the following semi-empirical formula:

$$D = 2b \cos(90/n) \tag{Eq. 10}$$

where D is the distance between two opposite walls, n is the number of sides in the regular polygon and b is the radius of the circle for the corresponding "theoretical" circular applicator cross section. Equation 10 gives the relationship for a circle that traverses each polygon side twice, symmetrically at ¼ of the angle as seen from the center. The error in Equation 10 is less than about 0.3% for typical practical systems.

In an assembly constructed in accordance with the teachings herein, a preferred load diameter of 27 mm, applicator length l (and heated load length) of 127 mm, (giving a load volume of about 73 cm³), a 1KW microwave power generator can be used for heating conventional food loads.

In order to reduce mutual coupling between adjacent applicators, (or in 90 mechanical degree shifted feed systems in the same applicator) halfwave rectifying power supplies (not shown) may be used with 180 or 120 degrees phase difference in the power supplies between the respective feed systems, whether in the same or adjacent applicators.

The waveguide 24 and arms 26, 28 of the present system are preferably conventional $TE_{10}$ type, with a 90 mm width and height of 22 mm in the arms and 50 mm in the waveguide 24. The feed slots 20 are each preferably 10.5 mm wide and 60 mm long (for the octagonal embodiment, this is equal to the width of one face of the applicator). The flag stabilizer 32 is preferably 20 mm long by 90 mm wide, extending across the full width of the waveguide 24 and galvanically bonded to the walls of the waveguide/applicator structure where it contacts such structure. The slots 20 are each located in the broadside of each arm 26, 28 and with the centerline of the aperture or slot 20 spaced about ¼ of a guide wavelength or 43 mm away from the shorted end 40 thereof As is conventional, the slot length itself is preferably about ½ of the free space wavelength.

Leakage from the applicator at the entrance aperture 34 and exit aperture 36 of the load tube 12 is low because the apertures 34, 36 do not interrupt any strong current (the current density is lowest where the axial E field is maximum—typically near the load circumferential periphery). Nevertheless, it is preferable to surround the microwave transparent load tube with a metal tube 38 extending for at least 25 mm beyond the adjacent end wall of the applicator. The load field outside the applicator will decay axially at a rate related to the power penetration depth $d_p$ of the load material, defined with a plane wave perpendicularly impinging on an infinitely extending halfspace of the load material. Typically, $d_p$ is about 10 mm (at 2450 MHz) resulting in about 5% remaining power density at a distance of 3 $d_p$ away from the apertures 34, 36 exterior of the cavity 18. Tube 38 may be made longer when used at the inlet and outlet of multi-applicator systems to reduce leakage even further.

The present invention provides a heating apparatus having at least two (but may have up to 20 or 30 or more) applicators 14 per system, each with a 1 KW power supply (for 2450 MHz systems) and with adjacent applicators spaced 90 degrees about the axis 30. For certain applications, the preferred material for the load tube 12 is polycarbonate with or without a non-stick internal coating, such as polytetrafluoroethylene; alternatively, the material for the load tube may be borosilicate glass or other suitable microwave transparent material.

In an alternative embodiment, a conveyor system may replace or be included within tube 12. For example, referring now most particularly to FIG. 9, a belt 42 may be deflected into a "trough-like" configuration 44 by one or more ring-like supports 46 to transport a load 48 made up, for example of particles 50 delivered by nozzle 52. The shaped load is then transported along the axis of travel 30 through the assembly 10. Such an arrangement will permit shaping of the load into a sufficiently circular cross section to be effectively heated using the present invention as shown and described. It is to be understood that other load cross sections (such as elliptical) are within the meaning of "circular cross section" herein, provided that such loads behave generally like a circular cross section load. By adjusting the flow rate out of nozzle 52 and the speed of belt 42, the mass flow rate of the load 48 may be controlled as desired. Similarly, the mass flow rate of a load material passing through the tube embodiment 12 may be controlled by a pump or auger moving the load material through tube 12. Alternatively, a flow restriction downstream of the assembly 10 may be used to control the mass flow rate of a load material moving vertically downward through assembly 10 via gravity.

Referring now to FIGS. 10–14, an alternative embodiment of the present invention is shown in the form of an octagonal cross section cavity 70. While the predicted length l for the axial length of an octagonal cavity is 121 mm, it has been found in practice that longer lengths are possible, and desirable from a practical standpoint, provided that no spurious modes are enabled. In practice, it has been found satisfactory to make the axial length l of cavity 70 130 mm (as measured along axis 30). It is believed that the axial length may possibly be extended further in practice, to reduce the power density along the axis 30. Cavity 70, being octagonal in cross section has 8 walls or faces, with each having a width of 64.6 mm, and wherein opposing parallel faces are spaced apart a distance of 156 mm. Cavity 70 has a first pair of opposed feed apertures 20 and a second pair of opposed feed apertures 21 located at 90 degrees about the axis 30 with respect to the first pair of feed apertures. Each of the feed apertures 20, 21 is preferably 64.6 mm long by 10.2 mm wide. Feed apertures 20 are fed by a first microwave feed system 72 and feed apertures 21 are fed by a second microwave feed system 74 which is preferably identical to feed system 72, except inverted and rotated 90 degrees. Each of feed systems 72 and 74 has a main waveguide 76 supplying a waveguide arms 78, 80. Each main waveguide preferably is powered by a magnetron 82, shown in phantom, and which has an antenna 84 projecting into an aperture 86, in a manner well-known. Each waveguide arm 78, 80 has a coupling slot 88 sized and positioned to match with its respective feed aperture 20 or 21. It is to be understood that feed systems 72, 74 may use the exterior of the walls of cavity 70 as part thereof for microwave containment, as is well-known in the art. Each of waveguide arms 78 and 80 has a mitered corner 94 and an offset 90 forming an H knee, modified to be chamfered at surface 92 sufficient to permit the first and second microwave feed systems 72 and 74 to nest together to couple to their respective feed apertures 20 and 21 without mechanical interference with each other. It is further to be understood that feed systems 72, 74 each preferably have flag 32 as a part thereof for the purpose described previously.

The present invention has the advantages of providing good matching and efficiency to loads having $\epsilon > 20$ and $\tan \delta > 0.3$. In addition, the single mode present gives a highly predictable heating pattern, allowing precise temperature control, when mass flow rate of the load is taken into consideration. There is no appreciable variation in the heating pattern in the axial direction 30, and no significant hot spots or leakage at the entrance or exit apertures 34, 36. Most importantly, the practice of the present invention permits elimination of circumferential variations in the heating pattern of the load through the use of the paired, 90 degree displaced applicators.

While the ISM frequency of 2450 MHz has been used herein, it is to be understood that other frequencies, such as 915 MHz may be used, as well, with a scale factor of about 2.5 for linear dimensions. However, it is to be recognized that $d_p$ at 915 MHz is typically less than 2.5 times larger than at 2450 MHz, depending upon the larger influence of ionic conduction. Therefore scaling may need to be modified to take this effect into account.

In outline form, the method of sizing a circular applicator to practice the present invention is as follows.

1. Determine the desired load diameter for load resonance using Equation 8 as a starting point for a first approximation and then using Equations 1–3 to finalize the desired load diameter.

2. Calculate applicator diameter using Equation 5 and iteratively solving for the roots where the imaginary part equals zero at $r_{b=\rho}$.

3. Plot the resonant frequency and, if desired, the cavity reflection factor, as a function of real permittivity with the dielectric loss tangent as a parameter.

4. Select the best compromise for local permittivity variations and diameter.

5. To extend the result to a polygonal cross section applicator, use Equation 10.

The invention is not to be taken as limited to all of the details thereof as modifications and variations thereof may be made without departing from the spirit or scope of the invention.

What is claimed is:

1. A microwave applicator assembly for applying microwave irradiation to a load having a generally circular cross-section, the assembly comprising
   a) means for positioning a load in the assembly along a central axis; and
   b) a pair of microwave feed systems, each sized to support only single dominant mode of the $TM_{120}$ type, with each feed system
      i) aligned along the central axis, and
      ii) delivering its respective mode at 90 degrees about the central axis with respect to the mode delivered by the other feed system such that the energy delivered by the microwave irradiation to the load is circumferentially evenly balanced in the modes delivered by the pair of feed systems to evenly heat the load.

2. The assembly of claim 1 wherein the assembly further comprises first and second microwave cavities, with one feed system connected to each cavity and further wherein the means for positioning the load further comprises means for conveying the load through the assembly from the first cavity to the second cavity.

3. The assembly of claim 2 wherein the means for conveying comprises a load conveyor.

4. The assembly of claim 2 wherein each cavity has a constant cross section in a direction parallel to the axis of travel.

5. The assembly of claim 4 wherein the cavity cross section is circular.

6. The assembly of claim 4 wherein the cavity cross section is polygonal.

7. The assembly of claim 6 wherein the cavity cross section is hexagonal.

8. The assembly of claim 6 wherein the cavity cross section is octagonal.

9. The assembly of claim 6 wherein the cavity cross section has a circumference formed of more than five relatively flat faces of equal width.

10. The assembly of claim 2 further comprising means for controlling the mass flow rate of the load along the central axis.

11. The assembly of claim 1 wherein the assembly has a cavity irradiated by microwave energy and the cavity and load is resonant for the $TM_{120}$ mode substantially independently of the dielectric property of the load within a range of about 20 to about 80 for relative real permittivity of the load.

12. The assembly of claim 1 further comprising a source of microwave energy at a predetermined frequency and wherein the means for positioning the load limits a maximum cross-sectional dimension of the load to be less than about three times the penetration depth of the microwave irradiation at the predetermined frequency.

13. The assembly of claim 12 wherein the predetermined frequency is within the 2450 MHz ISM band.

14. The assembly of claim 1 wherein the means for positioning comprises a microwave transparent tube.

15. The assembly of claim 1 wherein the feed system further comprises a pair of feed apertures positioned in opposing side walls of the cavity at a mid point along the central axis such that the feed apertures provide 180 degree phase difference in the H fields delivered by the pair of feed apertures.

16. The assembly of claim 15 further comprising a Y-connected pair of waveguide arms, with one of each of the pair of arms connected to one of the feed apertures and each of the arms joined to a main waveguide at a Y junction.

17. The assembly of claim 16 further comprising a flag stabilizer projecting into the Y junction between the arms and the main waveguide such that energy reflected in one arm is substantially blocked from entering the other arm.

18. The assembly of claim 1 wherein the load is generally circular in cross section.

19. A method of heating a load using a microwave applicator to automatically compensate for changes in the complex permittivity of the load comprising the steps of:
   a) positioning a generally cylindrical load along a central axis of a microwave applicator wherein the load diameter is constrained to a predetermined value selected according to a sum of modal patterns based on a set of cylindrical Bessel functions $J_m$ of the first kind and mth order such that the load will operate substantially at the largest slope of frequency increase with increasing complex permittivity; and
   b) sizing the internal radial dimension of the applicator to form a resonant system to maintain the resonant frequency of the combination of the load and free space within the applicator relatively constant with changes in the complex permittivity of the load.

20. A method of uniformly heating a generally cylindrical cross section load using a pair of microwave applicators comprising the steps of:
   a) applying a $TM_{120}$ mode to a load in a first applicator;
   b) moving the load from the first applicator to the second applicator along an axis of travel; and
   c) applying a $TM_{120}$ mode to the load in the second applicator where the second applicator is positioned circumferentially 90 degrees about the axis of travel with respect to the first applicator such that circumferential variations in the energy delivered to the load are substantially eliminated and the load is evenly heated as it moves along the axis of travel from the second applicator.

21. The method of claim 20 wherein step b) further comprises controlling the mass flow rate of the load.

22. A microwave applicator assembly for automatically compensating for different complex permittivities of loads heated by the applicator comprising:

a) a source of microwaves operating at a predetermined frequency;
b) load support means for positioning a generally circular cross section load along a central axis;
c) a microwave cavity sized to support only a single mode therein and causing internal resonance in the load and an E field maximum parallel to an outer surface of the load such that the microwave field in the combined load and cavity remain resonant at or near the predetermined frequency for loads having complex permittivity in a range above about 20 and dielectric loss tangent in a range above about 0.3.

23. The assembly of claim 22 wherein the load support means further comprises means for controlling the shape of the load to a generally circular cross section of predetermined diameter.

24. A microwave applicator assembly for automatically compensating for different complex permittivities of loads heated by the applicator comprising:
   a) a source of microwaves operating at a predetermined frequency;
   b) load support means for positioning a generally circular cross section load along a central axis;
   c) a microwave cavity sized to support only a single mode therein and is further sized to maximize the derivative $df_R/d\epsilon'$, where $f_R$ is an increasing resonant frequency of the load with respect to increasing $\epsilon'$, the dielectric constant for the load such that a microwave field in the combined load and cavity remain resonant at or near the predetermined frequency for loads having complex permittivity in a range above about 20 and dielectric loss tangent in a range above about 0.3.

* * * * *